US006267693B1

(12) United States Patent
Sullivan

(10) Patent No.: US 6,267,693 B1
(45) Date of Patent: *Jul. 31, 2001

(54) GOLF BALL COVERS CONTAINING HIGH ACID IONOMERS

(75) Inventor: Michael J. Sullivan, Chicopee, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/596,690

(22) Filed: Feb. 5, 1996

Related U.S. Application Data

(63) Continuation of application No. 08/174,765, filed on Dec. 27, 1993, now abandoned, which is a continuation of application No. 07/776,803, filed on Oct. 15, 1991, now abandoned.

(51) Int. Cl.$^7$ .................................................... A63B 37/12
(52) U.S. Cl. ................... 473/372; 260/998.14; 473/351; 473/378; 473/385; 524/908; 525/196; 525/201; 525/221; 525/330.2
(58) Field of Search ............................. 525/201; 473/372, 473/351, 378, 385

(56) References Cited

U.S. PATENT DOCUMENTS

| 3,819,768 | * | 6/1974 | Molitor ................................ 525/221 |
| 4,884,814 | | 12/1989 | Sullivan ............................... 273/235 |
| 4,911,451 | | 3/1990 | Sullivan et al. ....................... 273/235 |
| 4,984,804 | * | 1/1991 | Yamada et al. ........................ 525/196 |
| 5,000,459 | * | 3/1991 | Isaac ................................ 260/998.14 |
| 5,068,151 | * | 11/1991 | Nakamura ............................. 525/196 |
| 5,222,739 | * | 6/1993 | Horiuchi et al. ...................... 273/235 |
| 5,244,969 | * | 9/1993 | Yamada ................................ 525/196 |

FOREIGN PATENT DOCUMENTS

1207343 * 8/1989 (JP) ...................................... 525/221

OTHER PUBLICATIONS

Research Disclosure Document RDO 297,003, Jan. 10, 1989, "Ionomers Obtained from Ethylene–Acrylic or Methacrylic Acid, Useful for Golf Balls, Footwear, Ski Boots, Cosmetic Bottle Cap Closures, etc."

* cited by examiner

Primary Examiner—Fred Zitomer

(57) ABSTRACT

The present invention is directed to a golf ball comprising a core and a cover, wherein the cover comprises a blend of two or more high acid ionomer resins. Each high acid ionomer resin utilized in the blend of the cover composition comprises generally of greater than 16% by weight acid, preferably from about 17 to about 25% by weight acid and more preferably from about 18.5% to about 21.5% by weight acid. The acid groups of the high acid ionomers utilized in the cover compositions of the invention are partially (i.e. generally 10–75 percent, preferably 30–70 percent) neutralized by metal ions such as by sodium, zinc and magnesium ions. When the blend of two or more high acid ionomer resins is utilized to manufacture a golf ball, the golf ball produced thereby, exhibits properties of improved distance without sacrificing characteristics such as playability and/or durability when compared to low acid ionomer and/or low acid/high acid ionomer blends.

30 Claims, No Drawings

GOLF BALL COVERS CONTAINING HIGH ACID IONOMERS

This is a continuation of application Ser. No. 08/174,765, filed on Dec. 27, 1993 now abandoned which in turn is a file wrapper continuation of application Ser. No. 07/776,803, filed on Oct. 15, 1991 abandoned.

FIELD OF THE INVENTION

The present invention relates to golf balls and, more particularly, to improved golf ball covers made from blends of specific high acid ionomers. The improved golf ball covers are useful for producing golf balls, particularly multi-piece balls, exhibiting enhanced travel distance while maintaining the playability and/or durability characteristics necessary for repetitive play.

BACKGROUND OF THE INVENTION

Ionomeric resins are polymers containing interchain ionic bonding. As a result of their toughness, durability, and flight characteristics, various ionomeric resins sold by E.I. DuPont de Nemours & Company under the trademark "Surlyn®" and more recently, by the Exxon Corporation (see U.S. Pat. No. 4,911,451) under the trademarks "Escor®" and the tradename "Iotek", have become the materials of choice for the construction of golf ball covers over the traditional "balata" (trans polyisoprene, natural or synthetic) rubbers. The softer balata covers, although exhibiting enhanced playability properties, lack the durability properties required for repetitive play.

Ionomeric resins are generally ionic copolymers of an olefin, such as ethylene, and a metal salt of an unsaturated carboxylic acid, such as acrylic acid, methacrylic acid or maleic acid. In some instances, an additional softening comonomer such as an acrylate can also be included to form a terpolymer. The pendent ionic groups in the ionomeric resins interact to form ion-rich aggregates contained in a non-polar polymer matrix. The metal ions, such as sodium, zinc, magnesium, lithium, potassium, calcium, etc. are used to neutralize some portion of the acid groups in the copolymer resulting in a thermoplastic elastomer exhibiting enhanced properties, i.e. improved durability, etc. for golf ball construction over balata.

The ionomeric resins utilized to produce cover compositions can be formulated according to known procedures such as those set forth in U.S. Pat. No. 3,421,766 or British Patent No. 963,380, with neutralization effected according to procedures disclosed in Canadian Patent Nos. 674,595 and 713,631, wherein the ionomer is produced by copolymerizing the olefin and carboxylic acid to produce a copolymer having the acid units randomly distributed along the polymer chain. Broadly, the ionic copolymer generally comprises one or more $\alpha$-olefins and from about 9 to about 20 weight percent of $\alpha$, $\beta$-ethylenically unsaturated mono- or dicarboxylic acid, the basic copolymer neutralized with metal ions to the extent desired.

In this regard, generally at least 20% of the carboxylic acid groups of the copolymer are neutralized by the metal ions (such as sodium, potassium, zinc, calcium, magnesium, and the like) and exist in the ionic state. Suitable olefins for use in preparing the ionomeric resins include ethylene, propylene, butene-l, hexene-l, and the like. Unsaturated carboxylic acids include acrylic, methacrylic, ethacrylic, $\alpha$-chloroacrylic, crotonic, maleic, fumaric, itaconic acids, and the like. The ionomeric resins utilized in the golf ball industry are generally copolymers of ethylene with acrylic (i.e. Escor®) and/or methacrylic (i.e. Surlyn®) acid. In addition, two or more types of ionomeric resins may be blended into the cover compositions in order to produce the desired properties of the resulting golf balls.

Along this line, the properties of the cover compositions and/or the ionomeric resins vary according to the type and amount of the metal cation, the molecular weight, the composition of the base resin (i.e. the nature of the relative content of the olefin, the unsaturated carboxylic acid groups, etc.), the amount of acid, the degree of neutralization and whether additional ingredients such as reinforcement agents or additives are utilized. Consequently, the properties of the ionomer resins can be controlled and varied in order to produce golf balls having different playing characteristics, such as differences in hardness, playability (i.e. spin, feel, click, etc.), durability (i.e. impact and/or cut resistance), and resilience (i.e. coefficient of restitution).

However, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups), the degree of neutralization and additive ingredients such as reinforcement agents, etc., a great deal of research continues in order to develop golf ball cover compositions exhibiting not only the playability characteristics previously associated with the balata cover, but also the improved impact resistance and carrying distance properties produced by the ionomeric resins. Thus, an object of the present invention is to provide golf ball cover compositions which, when utilized in golf ball construction, produce balls exhibiting improved travel distance while maintaining satisfactory playability and durability properties.

In enhancing the distance a golf ball will travel when hit, there are a variety of factors which are considered. The coefficient of restitution, along with ball size, weight and additional factors such as club head speed, angle of trajectory, and ball aerodynamics (i.e., dimple pattern), generally determine the distance a ball will travel when hit. Since club head speed and the angle of trajectory are not factors easily controllable, particularly by golf ball manufacturers, the factors of concern among manufacturers are the coefficient of restitution and the surface dimple pattern of the ball.

A golf ball's coefficient of restitution (C.O.R.) is the ratio of the relative velocity of the ball after direct impact to that before impact. One way to measure the coefficient of restitution is to propel a ball at a given speed against a hard massive surface, and measure its incoming velocity and outgoing velocity. The coefficient of restitution is defined as the ratio of the outgoing velocity to incoming velocity of a rebounding ball and is expressed as a decimal. As a result, the coefficient of restitution can vary from zero to one, with one being equivalent to an elastic collision and zero being equivalent to an inelastic collision.

The coefficient of restitution of a one-piece golf ball is a function of the ball's composition. In a two-piece or a multi-layered golf ball, the coefficient of restitution is a function of the core, the cover and any additional layer. While there are no United States Golf Association (U.S.G.A.) limitations on the coefficient of restitution values of a golf ball, the U.S.G.A. requires that the golf ball cannot exceed an initial velocity of 255 feet/second. As a result, golf ball manufacturers generally seek to maximize the coefficient of restitution of a ball without violating the velocity limitation.

In various attempts to produce a high coefficient of restitution golf ball exhibiting the enhanced travel distance desired, the golfing industry has blended various ionomeric blends. However, many of these blends do not exhibit the durability and playability characteristics necessary for repetitive play and/or the enhanced travel distance desired.

The present invention is directed to the discovery that specific ionomer resins containing relative high amounts of acid (i.e. greater than 16 weight percent acid, preferably from about 17 to about 25 weight percent acid, and more preferably from about 18.5 to about 21.5 weight percent) and partially neutralized with sodium, zinc and magnesium ions, produce, when blended and melt processed according to the parameters set forth below, cover compositions exhibiting enhanced coefficient of restitution values when compared to low acid ionomers, or blends of low acid ionomer resins containing 16 weight percent acid or less. The new high acid ionomer cover compositions produce golf balls which exhibit properties of enhanced carrying distance (i.e. possess higher coefficient of restitution values) over known ionomer blends such as those set forth in U.S. Pat. Nos. 4,884,814 and 4,911,451, without sacrificing desirable characteristics such as playability and/or durability.

Along this line, until relatively recently, all of the ionomer resins commercially available contained at most 15 to 16 weight percent carboxylic acid. In 1989, Dupont introduced a number of new high acid ionomers and suggested that these new ionomers may have some use in previously known low acid ionomer applications such as the production of shoe soles, box toes, bowling pins, golf balls, ski boots, auto trim, etc.

Furthermore, Dupont suggested in a research disclosure (E.I. DuPont de Nemours & Co., Research Disclosure No. 297,003) that ionomers produced from polymers of ethylene acrylic acid or methacrylic acid containing greater than 15 weight percent acid can be melt processed to produce articles (i.e. golf balls, foot wear, ski boots, cosmetic bottle cap closures and so on) with good properties (i.e. improved stiffness, hardness and clarity) when compared with ionomers with lower acid levels.

However, not only has little information been provided concerning the acid levels and types of effective ionomers, particularly with respect to the art of golf ball manufacturing, it has been found that many cover compositions produced from polymers of ethylene/acrylic acid or ethylene/methacrylic acid containing greater than 15 weight percent acid have been dissatisfactory in that these compositions exhibit processing problems or are generally short on distance and/or durability and thus, are not particularly commercially viable. Similar poor results have been produced with covers composed of blends of high and low acid ethylene/acrylic acid or ethylene/methacrylic acid polymers and/or covers produced from single high acid ionomers.

The present invention is directed to improved golf ball covers made from specific blends of two or more high acid ionomers which do not exhibit the processing, distance and/or durability limitations demonstrated by the prior art. It has been found that these difficulties can be overcome utilizing the improved high acid ionomer blends of the present invention.

These and other objects and features of the invention will be apparent from the following description and from the claims.

SUMMARY OF THE INVENTION

In one aspect, the present invention is directed to a golf ball comprising a core and a cover, wherein the cover comprises a blend of two or more high acid ionomer resins. Each high acid ionomer resin utilized in the blend of the cover composition comprises generally greater than 16% by weight acid, preferably from about 17 to about 25% by weight acid and more preferably from about 18.5% to about 21.5% by weight acid. The acid groups of the high acid ionomers utilized in the cover compositions of the invention are partially (i.e. generally 10–75 percent, preferably 30–70 percent) neutralized by metal ions such as by sodium, zinc and magnesium ions. When the blend of two or more high acid ionomer resins is utilized to manufacture a golf ball, the golf ball produced thereby, exhibits properties of improved distance without sacrificing characteristics such as playability and/or durability when compared to low acid ionomer and/or low acid/high acid ionomer blends.

In another aspect, the invention relates to a golf ball comprising a core and a cover, wherein the cover comprises a blend of at least two high acid ionomer resins. Each high acid ionomer resin is comprised of an ethylene-methacrylic acid copolymer or an ethylene-acrylic acid copolymer containing greater than 16% by weight acid, preferably from about 17 to about 25% by weight acid, and more preferably from about 18.5 to about 21.5% by weight acid, with from about 10% to about 75% by weight (preferably from about 30% to about 70% by weight) of the carboxylic acid groups neutralized by metal ions such as by sodium, zinc or magnesium ions. Preferably, although not necessarily, the high acid ionomers utilized to produce the cover compositions of the invention have the same type of monocarboxylic acid (i.e. both are methacrylic acid or acrylic acid type high acid ionomers). In addition, the cover may consist of one or more additional ingredients such as pigments, dyes, U.V. absorbers and optical brighteners.

In a further aspect, the present invention concerns a golf ball comprising a core and a cover, wherein the cover is comprised of a blend of an ethylene-methacrylic acid copolymer containing greater than 16% by weight methacrylic acid, preferably from about 17% to about 25% by weight methacrylic acid, and more preferably 18.5% to about 21.5% by weight methacrylic acid, having from about 10% to about 75% of the carboxylic acid groups neutralized with sodium ions, and an ethylene-methacrylic acid copolymer containing greater than 16% by weight methacrylic acid, preferably from about 17% to about 25% by weight methacrylic acid, and more preferably 18.5% to about 21.5% by weight methacrylic acid, having from about 10% to about 75% of the carboxylic acid groups neutralized with zinc or magnesium ions. The ratio of sodium-high acid ethylene-methacrylic acid based ionomer to zinc or magnesium-high acid ethylene-methacrylic acid based ionomer is from about 90% to about 10% and from about 10% to about 90%. A more preferred range is from about 75% to about 25% and from about 25% to about 75%.

In a still another aspect, the invention relates to a golf ball comprising a core and a cover, wherein the cover comprises a blend of an ethylene-acrylic acid copolymer containing greater than 16% by weight acrylic acid, preferably from about 17 to about 25% by weight acrylic acid, and more preferably from about 18.5% to about 21.5% by weight acrylic acid, having from about 10% to about 75% of the carboxylic acid groups neutralized with sodium ions, and of an ethylene-acrylic acid copolymer containing greater than 16% by weight acrylic acid, preferably from about 17 to about 25% by weight acrylic acid, and more preferably from about 18.5% to about 21.5% by weight acrylic acid, having from about 10 to about 75% of the carboxylic acid groups neutralized with zinc or magnesium ions. The ratio of sodium-high acid ethylene-acrylic acid based ionomer to zinc or magnesium-high acid ethylene acrylic acid based ionomer is from 90% to about 10% and from 10% to about 90%. A more preferred range is from about 75% to about 25% and from about 25% to about 75%.

In a still further aspect, the invention is directed to a cover composition comprised of two or more high acid ionomer resins, wherein each high acid ionomer resin is comprised generally of greater than 16% by weight acid, preferably about 17 to about 25% by weight acid and more preferably from about 18.5% to about 21.5% by weight acid, and wherein each high acid ionomeric resin is from about 10 to about 75% by weight neutralized by metal ions such as by sodium, zinc and magnesium ions. The high acid ionomer resins produce, when blended and molded around solid or wound cores to formulate a cover composition, golf balls exhibiting enhanced distance (i.e. improved C.O.R.) without adversely affecting the balls' playability and/or durability characteristics.

DETAILED DESCRIPTION OF THE INVENTION

The present invention relates to improved cover compositions for golf ball construction. Specifically, according to the invention, golf balls having improved coefficient of restitution (C.O.R.) values are obtained using a cover material comprising specific blends of two or more high acid ionomers.

In this regard, the term "high acid ionomers" refers broadly to recently developed ionomer resins containing greater than 16 weight percent acid, preferably from about 17 to about 25 weight percent acid and more preferably from about 18.5 to about 21.5 weight percent methacrylic acid or acrylic acid. When utilized in golf ball cover construction, it has been found that the high acid ionomers, particularly blends of sodium and zinc high acid ionomers, as well as blends of sodium and magnesium high acid ionomers, extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451. By using the high acid ionomer resins of the present invention, harder, stiffer golf balls having higher C.O.R.s, and thus longer distance, are obtained.

The high acid ionomers suitable for use in the present invention are ionic copolymers which are the metal, i.e. sodium, zinc, magnesium, etc., salts of the reaction product of an olefin having from 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e. iso- or n-butylacrylate, etc.) can also be included to produce a softer terpolymer. The carboxylic acid groups of the copolymer are partially neutralized (i.e. approximately 10–75%, preferably 30–70%) by the metal ions. Of critical importance, each of the high acid ionomer resins included in the cover compositions of the invention must contain greater than 16% by weight of a carboxylic acid, preferably from about 17% to about 25% by weight of a carboxylic acid, more preferably from about 18.5% to about 21.5% by weight of a carboxylic acid.

Although the scope of the patent embraces all known high acid ionomeric resins falling within the parameters set forth above, only a relatively limited number of these high acid ionomeric resins are currently available. In this regard, the high acid ionomeric resins available from E.I. DuPont de Nemours Company under the trademark "Surlyn®", and the high acid ionomer resins available from Exxon Corporation under either the trademark "Escor®" or the tradename "Iotek" are examples of available high acid ionomeric resins which may be utilized in the present invention in the particular combinations described in detail below.

The high acid ionomeric resins available from Exxon under the designation "Escor®" and/or "Iotek", are somewhat similar to the high acid ionomeric resins available under the "Surlyn®" trademark. However, since the Escor®/Iotek ionomeric resins are sodium or zinc salts of poly (ethylene acrylic acid) and the "Surlyn®" resins are zinc, sodium, magnesium, etc. salts of poly(ethylene methacrylic acid) distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), and Surlyn® SEP-503-2 (magnesium cation). According to Dupont, all of these ionomers contain from about 18.5 to about 21.5% by weight methacrylic acid.

More particularly, Surlyn® AD-8422, is currently commercially available from DuPont in a number of different grades (i.e. AD-8422-2, AD-8422-3, AD-8422-5, etc.) based upon differences in melt index. According to DuPont, Surlyn® AD-8422 offers the following general properties when compared to Surlyn® 8920 the stiffest, hardest of all of the low acid grades (referred to as "hard" ionomers in U.S. Pat. No. 4,884,814):

|  | LOW ACID (15 wt % Acid) | HIGH ACID (>20 wt % Acid) | |
|---|---|---|---|
|  | SURLYN® 8920 | SURLYN® 8422-2 | SURLYN® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP[1], °C. | 88 | 86 | 85 |
| FP[1], °C. | 47 | 48.5 | 45 |
| COMPRESSION MOLDING[2] |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn® SEP-503-1 and SEP-503-2 ionomers can be defined as follows:

| Surlyn ® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn 8162 is currently commercially available from DuPont.

For comparison purposes, examples of commercially available low acid methacrylic acid based ionomer resins are set forth below. These are many of the "hard" ionomers utilized in the cover composition disclosed in U.S. Pat. No. 4,884,814. Along this line, the low acid ionomer resin cover compositions disclosed in the '814 patent are generally considered to be among the best prior art methacrylic acid based cover compositions currently available from Spalding & Evenflo Companies, Inc., the assignee of the present invention.

|  | ASTM D | 8940 | 9910 | 8920 |
|---|---|---|---|---|
| Cation Type |  | Sodium | Zinc | Sodium |
| Melt flow index, gms/10 min | D-1238 | 2.8 | 0.7 | 0.9 |
| Specific Gravity, g/cm³ | D-792 | 0.95 | 0.97 | 0.95 |
| Hardness, Shore D | D-2240 | 66 | 64 | 66 |
| Tensile Strength, (kpsi), MPa | D-638 | (4.8) 33.1 | (3.6) 24.8 | (5.4) 37.2 |
| Elongation, % | D-638 | 470 | 290 | 350 |
| Flexural Modulus, (kpsi) MPa | D-790 | (51) 350 | (48) 330 | (55) 380 |
| Tensile Impact (23° C.) KJ/m₂ (ft.-lbs./in²) | D-18225 | 1020 (485) | 1020 (485) | 865 (410) |
| Vicat Temperature, ° C. | D-1525 | 63 | 62 | 58 |
| % weight Methacrylic acid (MAA) |  | 15 | 15 | 15 |
| % of Acid Groups Cation Neutralized |  | 29 | 58 | 59 |

|  | ASTM D | 8528 | 9970 | 9730 |
|---|---|---|---|---|
| Cation Type |  | Sodium | Zinc | Zinc |
| Melt flow index, gms/10 min | D-1238 | 1.3 | 14.0 | 1.6 |
| Specific Gravity, g/cm³ | D-792 | 0.94 | 0.95 | 0.95 |
| Hardness, Shore D | D-2240 | 60 | 62 | 63 |
| Tensile Strength, (kpsi), MPa | D-638 | (4.2) 29.0 | (3.2) 22.0 | (4.1) 28.0 |
| Elongation, % | D-638 | 450 | 460 | 460 |
| Flexural Modulus, (kpsi) MPa | D-790 | (32) 220 | (28) 190 | (30) 210 |
| Tensile Impact (23° C.) KJ/m₂ (ft.-lbs./in²) | D-18225 | 1160 (550) | 760 (360) | 1240 (590) |
| Vicat Temperature, ° C. | D-1525 | 73 | 61 | 73 |
| % Weight Methacrylic acid (MAA) |  | 10 | 15 | 12 |
| % of Acid Groups Cation Neutralized |  | 54 | 22 | 38 |

Examples of the high acid acrylic acid based ionomers suitable for use in the present invention include the Escor® or Iotek high acid ethylene acrylic acid ionomers recently produced by Exxon. In this regard, Escor® or Iotek 959 is a sodium ion neutralized ethylene-acrylic acid copolymer and Escor® or Iotek 960 is a zinc neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions respectively. The physical properties of these high acid acrylic acid based ionomers are as follows:

| PROPERTY | ESCOR ® (IOTEK) 959 | ESCOR ® (IOTEK) 960 |
|---|---|---|
| Melt Index; g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

For comparison purposes, examples of commercially available low acid acrylic acid based ionomer resins, such as these utilized in U.S. Pat. No. 4,911,451 are set forth below.

| Typical Properties of Low Acid Escor ® (Iotek) Ionomers | | | | | | |
|---|---|---|---|---|---|---|
| Resin Properties | ASTM Method | Units | 4000 | 4010 | 8000 | 8020 |
| Cation type |  |  | zinc | zinc | sodium | sodium |
| Melt index | D-1238 | g/10 min. | 2.5 | 1.5 | 0.8 | 1.6 |
| Density | D-1505 | kg/m³ | 963 | 963 | 954 | 960 |
| Melting point | D-3417 | ° C. | 90 | 90 | 90 | 87.5 |
| Crystallization Point | D-3417 | ° C. | 62 | 64 | 56 | 53 |
| Vicat Softening Point | D-1525 | ° C. | 62 | 63 | 61 | 64 |

-continued

| Typical Properties of Low Acid Escor ® (Iotek) Ionomers | | | | | | |
|---|---|---|---|---|---|---|
| % Weight Acrylic Acid | | | 16 | — | 11 | — |
| % of Acid Groups Cation Neutralized | | | 30 | — | 40 | — |
| Plaque Properties | ASTM Method | Units | 4000 | 4010 | 8000 | 8020 |
| (3 mm thick, compression molded) | | | | | | |
| Tensile at Break | D-638 | MPa | 24 | 26 | 36 | 31.5 |
| Yield point | D-638 | MPa | none | none | 21 | 21 |
| Elongation at break | D-638 | % | 395 | 420 | 350 | 410 |
| 1% Secant modulus | D-638 | MPa | 160 | 160 | 300 | 350 |
| Shore Hardness D | D-2240 | — | 55 | 55 | 61 | 58 |
| Resin Properties | ASTM Method | Units | 8030 | 7010 | 7020 | 7030 |
| Cation type | | | sodium | zinc | zinc | zinc |
| Melt index | D-1238 | g/10 min. | 2.8 | 0.8 | 1.5 | 2.5 |
| Density | D-1505 | kg/m$^3$ | 960 | 960 | 960 | 960 |
| Melting Point | D-3417 | ° C. | 87.5 | 90 | 90 | 90 |
| Crystallization Point | D-3417 | ° C. | 55 | — | — | — |
| Vicat Softening Point | D-1525 | ° C. | 67 | 60 | 63 | 62.5 |
| % Weight Acrylic Acid | | | — | — | — | — |
| % of Acid Groups Cation Neutralized | | | — | — | — | — |
| Plaque Properties | ASTM Method | Units | 8030 | 7010 | 7020 | 7030 |
| (3 mm thick, compression molded) | | | | | | |
| Tensile at Break | D-638 | MPa | 28 | 38 | 38 | 38 |
| Yield point | D-638 | MPa | 23 | none | none | none |
| Elongation at break | D-638 | %. | 395 | 500 | 420 | 395 |
| 1% Secant modulus | D-638 | MPa | 390 | — | — | — |
| Shore Hardness D | D-2240 | — | 59 | 57 | 55 | 55 |

Furthermore, as indicated more particularly below in the Examples, cover compositions utilizing blends of two or more of the high acid ethylene acrylic acid based ionomers produced enhanced results and thus are the more preferred high acid ionomers over cover compositions produced utilizing blends of two or more high acid methacrylic acid based ionomers.

According to the present invention, it has been found that when two or more of the above-indicated high acid ionomers, particularly blends of sodium and zinc high acid ionomers, or blends of sodium and magnesium high acid ionomers, are processed according to the parameters set forth below to produce the covers of multi-layered golf balls, the resulting golf balls will travel further than previously known low acid ionomer resin covers and/or covers produced from high acid ionomers and/or high acid/low acid ionomer blends due to the balls' enhanced coefficient of restitution values. This is particularly important in that an improvement of 0.001 in C.O.R. generally relates to our improvement of about 0.2 to 0.5 yards in travel distance. In addition, the resulting golf balls maintain the playability and durability characteristics exhibited by known low-acid ionomer resin covered balls.

When blends of sodium and zinc high acid ionomers are used, the ratio of sodium high acid ionomer to zinc high acid ionomer can be from about 90% to about 10% and from about 10% to about 90%. A more preferred range is from about 75% to about 25% and from about 25% to about 75%.

Similarly, when blends of sodium and magnesium high acid ionomers are utilized, the ratio of sodium high acid ionomer to magnesium high acid ionomer can be from about 90% to about 10% and from about 10% to about 90%. A more preferred range is from about 75% to about 25% and from about 25% to about 75%.

Additional compatible additive materials may also be added to the compositions of the present invention, such as dyes (for example, Ultramarine Blue sold by Whitaker, Clark, and Daniels of South Painsfield, N.J.), and pigments, i.e. white pigments such as titanium dioxide (for example Unitane 0-110) zinc oxide, and zinc sulfate, as well as fluorescent pigments. As indicated in U.S. Pat. No. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since these are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardaley, N.Y. Uvitex OB is thought to be 2,5-Bis(5-tert-butyl-2-benzoxazoly)thiopene. Examples of other optical brighteners suitable for use in accordance with this invention are as follows: Leucopure EGM as sold by Sandoz, East Hanover, N.J. 07936. Leucopure EGM is thought to be 7-(2h-naphthol(1,2-d)-triazol-2yl)-3phenyl-coumarin. Phorwhite K-20G2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc. Kingsport, Tenn., is thought to be 4,4-Bis(benzoxaczoly) stilbene. The above-mentioned Uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.10% to about 0.020% depending on the optical properties of the particular optical brightener used and the polymeric environment in which it is a part.

Generally, the additives are admixed with a ionomer to be used in the cover composition to provide a masterbatch (M.B.) of desired concentration and an amount of the masterbatch sufficient to provide the desired amounts of additive is then admixed with the copolymer blends.

The cover compositions of the present invention may be produced according to conventional melt blending procedures. In this regard, two or more of the above indicated high acid ionomeric resins are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins and color masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 inches or greater and weighing about 1.620 ounces. The standards for both the diameter and weight of the balls are established by the United States Golf Association (U.S.G.A.). Although both solid core and wound cores can be utilized in the present invention, as a result of their lower cost and superior performance, solid molded cores are preferred over wound cores.

Conventional solid cores are typically compression molded from a slug of uncured or lightly cured elastomer composition comprising a high cis content polybutadiene and a metal salt of an α, β, ethylenically unsaturated carboxylic acid such as zinc mono or diacrylate or methacrylate. To achieve higher coefficients of restitution in the core, the manufacturer may include a small amount of a metal oxide such as zinc oxide. In addition, larger amounts of metal oxide than those that are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solid layer beneath the cover and above the core as in U.S. Pat. No. 4,431,193, and other multilayer and/or non-wound cores (such as those described in U.S. Pat. No. 4,848,770).

Wound cores are generally produced by winding a very large elastic thread around a solid or liquid filled balloon center. The elastic thread is wound around the center to produce a finished core of about 1.4 to 1.6 inches in diameter, generally. Since the core material is not an integral part of the present invention, a detailed discussion concerning the specific types of core materials which may be utilized with the cover compositions of the invention are not specifically set forth herein. In this regard, the cover compositions of the invention may be used in conjunction with any standard golf ball core.

As indicated, the golf balls of the present invention may be produced by forming covers consisting of the compositions of the invention around cores by conventional molding processes. For example, in compression molding, the cover composition is formed via injection at about 380° F. to about 450° F. into smooth surfaced hemispherical shells which are then positioned around the core in a dimpled golf ball mold and subjected to compression molding at 200–300° F. for 2–10 minutes, followed by cooling at 50–70° F. for 2–10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 100° F. After molding the golf balls produced may undergo various further finishing steps such as buffing, painting, and marking as disclosed in U.S. Pat. No. 4,911,451.

The present invention is further illustrated by the following examples in which the parts of the specific ingredients are by weight (pbw). It is to be understood that the present invention is not limited to the examples, and various changes and modifications may be made in the invention without departing from the spirit and scope thereof.

EXAMPLES

By blending the ingredients set forth in the Tables below, a series of cover formulations were produced. Finished golf balls were prepared using the cover compositions of the present invention, controls and comparative cover compositions by positioning a solid preformed cross-linked polybutadiene core in an injection molding cavity in such a manner to permit the uniform injection of the selected cover composition over each core. Along this line, the cover formulations were injection molded at about 400° F. around identical solid type cores having a finished diameter of 1.545 inches to produce golf balls approximately 1.680 inches in diameter having a normal cover thickness of 0.0675 inches. All materials were molded under essentially identical conditions. The properties of Riehle compression, coefficient of restitution (C.O.R.), shore hardness, cold crack, cut resistance, and wet barrel for the cover compositions were then determined.

In conducting the comparative prior art testing, Surlyn® 9910, Surlyn® 8940, Escor® 4000 and Escor® 900/8000 ionomers were utilized. In this regard, blends of Surlyn® 9910 and Surlyn® 8940 (i.e. the subject of U.S. Pat. No. 4,884,814) and blends of Escor® 4000 and Escor® 900/8000 (i.e. the subject of U.S. Pat. No. 4,911,451) are considered by the inventors to be generally among the best prior art cover compositions concerning ethylene-methacrylic acid and ethylene-acrylic acid ionomer blends, respectively.

In the examples set forth below Surlyn® White MB (master batch) is, unless indicated differently, comprised of 74.9% Surlyn® 8528, 23.7% Unitane 0-110, 0.24% Ultra Blue, 1.05% Uvitex O.B. and 0.03% Santonox R; and, Escor® (Iotek) White MB (masterbatch) is comprised of 74.9% Iotek 4000, 23.7% Unitane 0-110, 0.24% Ultra Blue, 1.05% Uvitex O.B., and 03.% Santonox R.

The data for each example represents the average data for one dozen balls produced according to the desired manner. The properties were measured according to the following parameters:

Riehle compression is a measurement of the deformation of a golf ball in thousandths of an inch under a fixed static load of 225 pounds (i.e. a Riehle compression of 47 corresponds to a deflection under load of 0.047 inches).

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test D-2240.

Cut resistance was measured in accordance with the following procedure: A golf ball is fired at 135 feet per second against the leading edge of a pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1–5. 5 represents a cut that extends completely through the cover to the core; a 4 represents a cut that does not extend completely through the cover but that does break the surface; a 3 does not break the surface of the cover but does leave a permanent dent; a 2 leaves only a slight crease which is permanent but not as severe as 3; and a 1 represents virtually no visible indentation or damage of any sort.

Cold cracking resistance was measured by firing balls from an air cannon, 5 blows at 165 feet/sec, after the balls had been conditioned for 24 hours at −10° F. After allowing the balls to equilibrate to room temperature the balls are inspected for cover cracking.

Wet barrel is a coating adhesion test performed as follows: Finished clear coated balls are cured a total of 16 hours at 125° F.±5° in production clear coat oven. Balls are water soaked at least 3 hours prior to barrel testing for 100 blows at 135 feet/sec. After barrel testing, balls are dyed, inspected and reported.

TABLE 1

| | Formulations | | | | | |
|---|---|---|---|---|---|---|
| | 1 | 2 | 3 | 4 | 5 | 6 |
| Ingredients | | | | | | |
| SURLYN 9910 (Zn) | 438 | — | — | — | — | — |
| SURLYN 8940 (Na) | 1370 | — | — | — | — | — |
| SURLYN 8422-2 (Na) | — | — | 1807 | — | — | 904 |
| SURLYN 8422-3 (Na) | — | — | — | 1807 | — | — |
| SURLYN 7940 (Li)[1] | — | — | — | — | 1807 | 904 |
| ESCOR 4000 (Zn) | — | 904 | — | — | — | — |
| ESCOR 900 (Na) | — | 904 | — | — | — | — |
| SURLYN WHITE MB | 193 | — | 193 | 193 | 193 | 193 |
| ESCOR WHITE MB | — | 193 | — | — | — | — |
| PROPERTIES | | | | | | |
| WEIGHT | 45.2 | 45.3 | 45.2 | 45.2 | 44.9 | 45.1 |
| COMPRESSION | 47 | 45 | 46 | 44 | 50 | 46 |
| C.O.R | .817 | .822 | .816 | .817 | .816 | .817 |
| COLD CRACK | NB | NB | 3BK | 3BK | NB | 5BK |

| | Formulations | | | | |
|---|---|---|---|---|---|
| | 7 | 8 | 9 | 10 | 11 |
| Ingredients | | | | | |
| SURLYN 9910 (Zn) | — | 219 | 219 | — | — |
| SURLYN 8940 (Na) | — | 685 | 685 | — | — |
| SURLYN 8422-2 (Na) | — | 904 | — | 904 | — |
| SURLYN 8422-3 (Na) | 904 | — | — | — | — |
| SURLYN 7940 (Li)[1] | 904 | — | 904 | — | 904 |
| ESCOR 4000 (Zn) | — | — | — | 452 | 452 |
| ESCOR 900 (Na) | — | — | — | 452 | 452 |
| SURLYN WHITE MB | 193 | 193 | 193 | — | — |
| ESCOR WHITE MB | — | — | — | 193 | 193 |
| PROPERTIES | | | | | |
| WEIGHT | 45.1 | 45.2 | 44.9 | 45.2 | 45.0 |
| COMPRESSION | 47 | 47 | 49 | 45 | 49 |
| C.O.R. | .818 | .819 | .816 | .818 | .817 |
| COLD CRACK | 2BK | 3BK | NB | 4BK | 1BK |

[1]Surlyn ®7940 is a 61,000 psi flex-modulus, lithium neutralized poly (ethylene-methacrylic acid) ionomer

TABLE 2

| | Formulations | | | | |
|---|---|---|---|---|---|
| | 12 | 13 | 14 | 15 | 16 |
| Ingredients | | | | | |
| SURLYN 9910 (Zn) | 438 | — | 438 | — | — |
| SURLYN 8940 (Na) | 1370 | — | — | — | 1370 |
| SURLYN 8422-3 (Na) | — | — | 1370 | 904 | — |
| SURLYN 7940 (Li)[1] | — | — | — | — | 438 |
| ESCOR 4000 (Zn) | — | 904 | — | — | — |
| ESCOR 900 (Na) | — | 904 | — | 904 | — |
| ESCOR WHITE MB | — | 193 | — | 193 | — |
| SURLYN WHITE MB | 193 | — | 193 | — | 193 |

TABLE 2-continued

| | | | | | |
|---|---|---|---|---|---|
| LUCALEN MX-4300[2] | — | — | — | — | — |
| LUCALEN HX-4300[3] | — | — | — | — | — |
| PROPERTIES | | | | | |
| WEIGHT | 45.6 | 45.7 | 45.9 | 45.9 | 45.6 |
| COMPRESSION | 54 | 51 | 50 | 50 | 53 |
| C.O.R. | .814 | .819 | .815 | .814 | .811 |
| WET BARREL TEST | — | — | — | — | — |
| COLD CRACK | — | — | — | — | — |

| | Formulations | | | | |
|---|---|---|---|---|---|
| | 17 | 18 | 19 | 20 | 21 |
| Ingredients | | | | | |
| SURLYN 9910 (Zn) | — | — | — | — | 438 |
| SURLYN 8940 (Na) | 1370 | 1370 | 904 | — | — |
| SURLYN 8422-3 (Na) | — | — | — | — | — |
| SURLYN 7940 (Li)[1] | — | — | — | — | 1370 |
| ESCOR 4000 (Zn) | — | — | — | — | — |
| ESCOR 900 (Na) | — | — | — | 904 | — |
| ESCOR WHITE MB | — | — | — | 193 | — |
| SURLYN WHITE MB | 193 | 193 | 193 | — | 193 |
| LUCALEN MX-4300[2] | 438 | — | 904 | 904 | — |
| LUCALEN HX-4300[3] | — | 438 | — | — | — |
| PROPERTIES | | | | | |
| WEIGHT | 45.8 | 45.9 | 45.6 | 45.6 | 45.8 |
| COMPRESSION | 52 | 52 | 53 | 52 | 53 |
| C.O.R. | .812 | .813 | .810 | .806 | .812 |
| WET BARREL TEST | 1BK | — | — | — | — |
| COLD CRACK | 7BK | — | — | — | — |

| | Formulations | | | |
|---|---|---|---|---|
| | 22 | 23 | 24 | 25 |
| Ingredients | | | | |
| SURLYN 9910 (Zn) | — | — | — | — |
| SURLYN 8940 (Na) | — | — | — | — |
| SURLYN 8422-3 (Na) | 904 | 904 | — | — |
| SURLYN 7940 (Li)[1] | — | 904 | 452 | 1356 |
| ESCOR 4000 (Zn) | — | — | 678 | 226 |
| ESCOR 900 (Na) | — | — | 678 | 226 |
| ESCOR WHITE MB | 193 | 193 | 193 | 193 |
| SURLYN WHITE MB | — | — | — | — |
| LUCALEN MX-4300[2] | 904 | — | — | — |
| LUCALEN HX-4300[3] | — | — | — | — |
| PROPERTIES | | | | |
| WEIGHT | 45.6 | 45.0 | 45.7 | 45.1 |
| COMPRESSION | 51 | 50 | 50 | 50 |
| C.O.R. | .809 | .815 | .816 | .813 |
| WET BARREL TEST | — | — | — | — |
| COLD CRACK | — | — | — | — |

[1] Surlyn® 7940 is a 61,000 psi flex-modulus, lithium neutralized poly (ethylene-methacrylic acid) ionomer.
[2] Lucalen MX-4300 is a 30,000 psi flex-modulus, zinc neutralized poly (ethylene-acrylic acid) ionomer.
[3] Lucalen HX-4300 is a 20,000 psi flex-modulus, zinc neutralized poly (ethylene-acrylic acid) ionomer.

TABLE 2 (Cont.)

| | Formulations | | | |
|---|---|---|---|---|
| | 22 | 23 | 24 | 25 |
| Ingredients | | | | |
| SURLYN 9910 (Zn) | — | — | — | — |
| SURLYN 8940 (Na) | — | — | — | — |
| SURLYN 8422-3 (Na) | 904 | 904 | — | — |
| SURLYN 7940 (Li)[1] | — | 904 | 452 | 1356 |
| ESCOR 4000 (Zn) | — | — | 678 | 226 |
| ESCOR 900 (Na) | — | — | 678 | 226 |
| ESCOR WHITE MB | 193 | 193 | 193 | 193 |
| SURLYN WHITE MB | — | — | — | — |
| LUCALEN MX-4300[2] | 904 | — | — | — |
| LUCALEN HX-4300[3] | — | — | — | — |
| PROPERTIES | | | | |
| WEIGHT | 45.6 | 45.0 | 45.7 | 45.1 |
| COMPRESSION | 51 | 50 | 50 | 50 |
| C.O.R. | .809 | .815 | .816 | .813 |
| WET BARREL TEST | — | — | — | — |
| COLD CRACK | — | — | — | — |

[1] Surlyn® 7940 is a 61,000 psi flex-modulus, lithium neutralized poly (ethylene-methacrylic acid) ionomer.
[2] Lucalen MX-4300 is a 30,000 psi flex-modulus, zinc neutralized poly (ethylene-acrylic acid) ionomer.
[3] Lucalen HX-4300 is a 20,000 psi flex-modulus, zinc neutralized poly (ethylene-acrylic acid) ionomer.

TABLE 3

| | Formulations | | | | |
|---|---|---|---|---|---|
| | 26 | 27 | 28 | 29 | 30 |
| Ingredients | | | | | |
| SURLYN 9910 (Zn) | 438 | — | — | — | — |
| SURLYN 8940 (Na) | 8940 | — | — | — | — |
| SURLYN 8422-3 (Na) | — | — | 1808 | — | 904 |
| SURLYN 7940 (Li) | — | — | — | 1808 | 904 |
| ESCOR 4000 (Zn) | — | 904 | — | — | — |
| ESCOR 900 (Na) | — | 904 | — | — | — |
| SURLYN WHITE MB | 192 | — | 192 | 192 | 192 |
| ESCOR WHITE MB | — | 192 | — | — | — |
| PROPERTIES | | | | | |
| WEIGHT | 45.1 | 45.3 | 45.4 | 45.1 | 45.1 |
| C.O.R. | .805 | .812 | .812 | .805 | .809 |
| COMPRESSION | 48 | 48 | 44 | 49 | 47 |
| DENSITY | 67 | 69 | 72 | 68 | 70 |
| STEIFFEL | 10/2 | 11/2 | 3/1 | 9/2 | 7/2 |
| CUT TEST | 2/3 | 1/3 | 9/2 | 3/3 | 4/3 |

TABLE 4

| | Formulations | | | |
|---|---|---|---|---|
| | 31 | 32 | 33 | 34 |
| Ingredients | | | | |
| SURLYN AD 8422-3 (Na) | — | — | 45.4 | 45.4 |
| SURLYN SEP 503-1 (Zn) | — | — | 45.4 | — |
| SURLYN SEP 503-2 (Mg) | — | — | — | 45.4 |
| SURLYN 7940 (Li) | — | — | — | — |
| SURLYN 9910 (Zn) | 22.2 | — | — | — |
| SURLYN 8940 (Na) | 68.5 | — | — | — |
| ESCOR 4000 (Zn) | — | 45.4 | — | — |

TABLE 4-continued

|  | | | | |
|---|---|---|---|---|
| ESCOR 900 (Na) | — | 45.4 | — | — |
| TG WHITE SURLYN | 9.3 | — | 9.3 | 9.3 |
| TG WHITE ESCOR | — | 9.3 | — | — |
| HI-MILAN AM 7311 (Mg)[1] | — | — | — | — |
| SURLYN 8269 (Na) | — | — | — | — |
| SURLYN 8270 (Zn) | — | — | — | — |
| PROPERTIES | | | | |
| WEIGHT | 44.7 | 45.1 | 45.0 | 44.9 |
| COMPRESSION | 47 | 46 | 46 | 46 |
| C.O.R. | .815 | .818 | .821 | .818 |
| WET BARREL TEST | NB | NB | 1BK | 2BK |

|  | Formulations | | | |
|---|---|---|---|---|
|  | 35 | 36 | 37 | 38 |
| Ingredients | | | | |
| SURLYN AD 8422-3 (Na) | — | — | 45.4 | — |
| SURLYN SEP 503-1 (Zn) | 45.4 | — | — | 45.4 |
| SURLYN SEP 503-2 (Mg) | 45.4 | — | — | — |
| SURLYN 7940 (Li) | — | 45.4 | — | — |
| SURLYN 9910 (Zn) | — | — | — | — |
| SURLYN 8940 (Na) | — | — | — | — |
| ESCOR 4000 (Zn) | — | — | — | — |
| ESCOR 900 (Na) | — | — | — | — |
| TG WHITE SURLYN | 9.3 | 9.3 | 9.3 | — |
| TG WHITE ESCOR | — | — | — | — |
| HI-MILAN AM 7311 (Mg)[1] | — | 45.4 | — | — |
| SURLYN 8269 (Na) | — | — | — | 45.4 |
| SURLYN 8270 (Zn) | — | — | 45.4 | — |
| PROPERTIES | | | | |
| WEIGHT | 45.0 | 44.9 | 45.1 | 45.0 |
| COMPRESSION | 48 | 49 | 53 | 55 |
| C.O.R. | .816 | .811 | .805 | .800 |
| WET BARREL TEXT | NB | — | — | — |

[1]HI-Milan AM 7311 (Mg) is a 53,000 psi flex-modulus, magnesium neutralized poly (ethylene-methacrylic acid) ionomer.

TABLE 5

|  | Formulations | | | | | |
|---|---|---|---|---|---|---|
|  | 39 | 40 | 41 | 42 | 43 | 44 |
| Ingredients | | | | | | |
| SURLYN AD-8422 (Na) | — | — | 1814 | — | — | 908 |
| SURLYN SEP-503-1 (Zn) | — | — | — | 1814 | — | 908 |
| SURLYN SEP-503-2 (Mg) | — | — | — | — | 1814 | — |
| SURLYN 9910 (Zn) | 908 | — | — | — | — | — |
| SURLYN 8940 (Na) | 908 | — | — | — | — | — |
| ESCOR 4000 (Zn) | — | 908 | — | — | — | — |
| ESCOR 900 (Na) | — | 908 | — | — | — | — |
| TG WHITE SURLYN MB | 186 | — | 186 | 186 | 186 | 186 |
| TG WHITE ESCOR MB | — | 186 | — | — | — | — |
| SURLYN 7940 (Li) | — | — | — | — | — | — |
| PROPERTIES | | | | | | |
| C.O.R. | .814 | .818 | .818 | .814 | .812 | .820 |
| COMPRESSION | 49 | 47 | 47 | 48 | 50 | 47 |
| HARDNESS SHORE D | 66 | 67 | 70 | 67 | 69 | 69 |

|  | Formulations | | | | | |
|---|---|---|---|---|---|---|
|  | 45 | 46 | 47 | 48 | 49 | 50 |
| Ingredients | | | | | | |
| SURLYN AD-8422 (Na) | 908 | — | 908 | — | — | 908 |
| SURLYN SEP-503-1 (Zn) | — | 908 | — | 908 | 908 | — |
| SURLYN SEP-503-2 (Mg) | 908 | 908 | — | — | — | — |
| SURLYN 9910 (Zn) | — | — | 908 | — | — | — |
| SURLYN 8940 (Na) | — | — | — | 908 | — | — |
| ESCOR 4000 (Zn) | — | — | — | — | — | — |
| ESCOR 900 (Na) | — | — | — | — | — | — |
| TG WHITE SURLYN MB | 186 | 186 | 186 | 186 | 186 | 186 |
| TG WHITE ESCOR MB | — | — | — | — | — | — |
| SURLYN 7940 (Li) | — | — | — | — | 908 | 908 |
| PROPERTIES | | | | | | |
| C.O.R. | .816 | .813 | .815 | .815 | .815 | .813 |
| COMPRESSION | 49 | 49 | 48 | 48 | 47 | 49 |
| HARDNESS SHORE D | — | — | — | — | — | — |

TABLE 6

|  | Formulations | | | | |
|---|---|---|---|---|---|
|  | 51 | 52 | 53 | 54 | 55 |
| Ingredients | | | | | |
| SURLYN AD-8422 (Na) | — | — | 908 | 908 | — |
| SURLYN SEP-503-1 (Zn) | — | — | 908 | — | 908 |
| SURLYN SEP-503-2 (Mg) | — | — | — | 908 | 908 |
| SURLYN 9910 (Zn) | 908 | — | — | — | — |
| SURLYN 8940 (Na) | 908 | — | — | — | — |
| ESCOR 4000 (Zn) | — | 908 | — | — | — |
| ESCOR 900/8000 (Na) | — | 908 | — | — | — |
| TG WHITE MB (SURLYN) | 186 | — | 186 | 186 | 186 |
| TG WHITE MB (ESCOR) | — | 186 | — | — | — |
| PROPERTIES | | | | | |
| WEIGHT | 45.1 | 45.1 | 45.3 | 45.2 | 45.1 |
| COMPRESSION | 52 | 50 | 49 | 49 | 49 |
| C.O.R. | .816 | .819 | .823 | .822 | .819 |
| COLD CRACK | NB | NB | 1BK | NB | 2BK |

|  | Formulations | | | | |
|---|---|---|---|---|---|
|  | 56 | 57 | 58 | 59 | 60 |
| Ingredients | | | | | |
| SURLYN AD-8422 (Na) | 1362 | 454 | 1362 | 454 | 454 |
| SURLYN SEP-503-1 (Zn) | 454 | 1362 | — | 454 | 454 |
| SURLYN SEP-503-2 (Mg) | — | — | 454 | — | — |
| SURLYN 9910 (Zn) | — | — | — | 454 | — |
| SURLYN 8940 (Na) | — | — | — | 454 | — |
| ESCOR 4000 (Zn) | — | — | — | — | 454 |
| ESCOR 900/8000 (Na) | — | — | — | — | 454 |
| TG WHITE MB (SURLYN) | 186 | 186 | 186 | 186 | 93 |
| TG WHITE MB (ESCOR) | — | — | — | — | 93 |
| PROPERTIES | | | | | |
| WEIGHT | 45.1 | 45.2 | 45.1 | 45.1 | 45.1 |
| COMPRESSION | 48 | 50 | 51 | 51 | 51 |
| C.O.R. | .822 | .822 | .820 | .821 | .822 |
| COLD CRACK | NB | 5BK | 3BK | NB | 1BK |

TABLE 7

| | Formulations | | | |
|---|---|---|---|---|
| | 61 | 62 | 63 | 64 |
| Ingredients | | | | |
| SURLYN AD-8422-5 (Na) | 100 | — | 50 | 75 |
| SURLYN AD-8162 (Zn) | — | 100 | 50 | 25 |
| TG WHITE SURLYN MB[1] | 10 | 10 | 10 | 10 |
| ESCOR 4000 (Zn) | — | — | — | — |
| ESCOR 900/8000 (Na) | — | — | — | — |
| ESCOR WHITE MB | — | — | — | — |
| PROPERTIES | | | | |
| WEIGHT | 45.2 | 45.1 | 45.2 | 45.3 |
| C.O.R. | .816 | .813 | .819 | .818 |
| COMPRESSION | 50 | 53 | 50 | 49 |

| | Formulations | | | |
|---|---|---|---|---|
| | 65 | 66 | 67 | 68 |
| Ingredients | | | | |
| SURLYN AD-8422-5 (Na) | 25 | — | — | — |
| SURLYN AD-8162 (Zn) | 75 | — | — | — |
| TE WHITE SURLYN MB | 10 | — | — | — |
| ESCOR 4000 (Zn) | — | 50 | 100 | — |
| ESCOR 900/8000 (Na) | — | 50 | — | 100 |
| ESCOR WHITE MB | — | 10 | 10 | 10 |
| PROPERTIES | | | | |
| WEIGHT | 45.3 | 45.2 | 45.0 | 45.1 |
| C.O.R. | .820 | .817 | .799 | .813 |
| COMPRESSION | 50 | 50 | 56 | 52 |

[1]T.G. White Surlyn MB (masterbatch) is comprised of 75.85% Surlyn ® 8528, 23.77% Unitane 0-110, 0.05% Ultra Blue, 0.22% Uvitex O.B. and 0.03% Santonox R.

TABLE 8

| | Formulations | | |
|---|---|---|---|
| | 69 | 70 | 71 |
| Ingredients | | | |
| ESCOR (Iotek) 8000 (Na) | 45.2 | — | — |
| ESCOR (Iotek) 7030 (Zn) | 45.2 | — | — |
| ESCOR (Iotek) 959 (Na) | — | — | 45.2 |
| ESCOR (Iotek) 960 (Zn) | — | — | 45.2 |
| MB-ESCOR | 9.6 | — | 9.6 |
| SURLYN 8422-5 (Na) | — | 22.6 | — |
| SURLYN 8162 (Zn) | — | 67.8 | — |
| MB-SURLYN | — | 9.6 | — |
| PROPERTIES | | | |
| WEIGHT | — | — | — |
| C.O.R. | .800 | .802 | .806 |
| COMPRESSION | — | — | — |
| COLD CRACK | — | — | — |

Discussion of the Examples

The data set forth in Tables 1–8 directed to covers composed of a single high acid grade ionomer (i.e. sodium-high acid Surlyn® 8422-2, sodium-high acid Surlyn® 8422-3, zinc-high acid Surlyn® 8162, sodium-high acid Escor® 959, zinc-high acid Escor® 960, etc.) blended with a single low acid grade ionomer (i.e. zinc-low acid Surlyn® 9910, sodium-low acid Surlyn® 8940, lithium-low acid Surlyn® 7940, zinc-low acid Escor® 4000/7030, sodium-low acid Escor® 900/8000, etc.) indicates that such high acid/low acid ionomer blends do not result in cover compositions exhibiting higher coefficient of restitution values while maintaining the desired durability and playability (i.e. compression, hardness, etc.) characteristics over those obtained using what is generally regarded by the inventors as being the best prior art (i.e. blends of Escor® 4000/7030 and Escor® 900/8000, the subject matter of U.S. Patent No. 4,911,451, which are set forth for comparison purposes in Examples (i.e. "Formulations") 2, 13, 27, 32, 40, 52, 66 and 69).

In addition, the data set forth in the Tables 1–8 supports the findings disclosed in U.S. Pat. No. 4,911,451 that covers comprised singularly or blends of ethylene-acrylic acid ionomers such as zinc neutralized ethylene-acrylic acid copolymer and/or sodium neutralized ethylene-acrylic acid copolymer, i.e. the Escor® 4000/7030 and 900/8000 ionomers respectively, exhibit markedly elevated coefficients of restitution (C.O.R.) values in comparison to comparable Surlyn® salts of poly (ethylene-methacrylic copolymers) i.e. (Surlyn® 9910 and Surlyn® 8940 in the Examples) while maintaining the durability and playability properties desired.

Moreover, the data further indicates that it is not until the cover compositions are composed of blends of at least two or more high acid grade ionomers that cover compositions exhibiting improved coefficient of restitution values are obtained over the prior art while maintaining the durability and playability characteristics desired. This can be seen for instance in Examples 33, 34, 44, 53–58, 63–65 and 71. In this regard, it has been found that when blends of two or more high acid ionomers, such as blends containing sodium-high acid ionomers (i.e. Surlyn® AD 8422, Escor® 959, etc.) and magnesium-high acid ionomers (i.e. Surlyn® SEP-503-2), and more preferably, blends containing sodium-high acid ionomers (i.e. Surlyn® AD 8422, Escor® 959, etc.) and zinc-high acid ionomers (i.e. Surlyn® 8162, Surlyn® SEP-503-1, Escor® 960, etc.), are utilized to produce the cover material of the golf ball, harder, stiffer golf balls having higher C.O.R. values are obtained. This is demonstrated with respect to the sodium-high acid/zinc-high acid blends in Examples 33, 44, 53, 56–57, 63–65 and 71, the preferred cover composition of the invention, and with respect to the sodium-high acid/magnesium blends in Examples 34, 54 and 58. Further, the data set forth in Example 55 indicates that blends of magnesium-high acid/zinc-high acid may be effective. However, as a result of the difficulties noted in durability, this blend is not as preferred as the sodium-high acid/zinc-high acid and the sodium high acid/magnesium-high acid blends noted above.

The most preferred methacrylic acid based high acid ionomer formulation to date is that exhibited in Example 56 (i.e. a blend of about 75 weight % sodium-high acid ionomer and about 25 weight % zinc-high acid ionomers) since it consistently produces the highest C.O.R. values along with the necessary cold cracking resistance. However, as indicated in the Examples (see for instance Examples 63–65), the effective range of the invention varies greatly. The only apparent limiting variable is that the cover composition must be composed of blends of at least two or more high acid grade compositions exhibiting the characteristics set forth above.

Further, although limited data has been collected as a result of the only recent availability of acrylic acid based high acid ionomers, Example 71 represents the most preferred acrylic acid based high acid ionomer blend to date. As exhibited briefly in Table 8, the acrylic acid based high acid ionomer blends may produce significant improvements over those currently exhibited by cover compositions comprised of blends of high acid methacrylic acid based ionomer resins.

Moreover, the data also indicates that cover compositions comprised of only a single high acid ionomer are generally ineffective. This is consistent with previous findings concerning ionomers utilized in golf ball cover applications. As indicated U.S. Pat. Nos. 3,819,768 and 4,911,451, a synergistic enhancement in coefficient of restitution may be obtained by blending different cation neutralized ionomers, such as by blending zinc and sodium ionomers (as well as contributing good low temperature durability) and this relationship apparently also holds for the high-acid ionomer blends of the present invention as well.

In addition, as indicated in Examples 59 and 60, the cover compositions containing two or more high acid ionomers may also be blended with effective amounts of low ionomer resins to produce covers exhibiting enhanced C.O.R. values while maintaining adequate durability and playability properties. As a result, the new "high acid" ionomeric resin blends extend the range of hardness beyond that previously obtainable, while maintaining all of the beneficial properties (i.e. durability, etc.) of the softer low acid ionomer covered balls.

Consequently, as it can be readily appreciated from review of the data set forth above, the novel high-acid ionomer blends of the cover compositions of the invention produce not only the durability and playability characteristics associated with prior art low acid ionomer blends, but also enhanced coefficient of restitution, and thus, enhanced carrying or travel distance, desired.

The invention has been described with reference to the preferred embodiments. Obviously, modifications and alterations will occur to others upon a reading and understanding of the preceding detailed description. It is intended that the invention be construed as to include all such alterations and modifications insofar as they come within the scope of the claims and the equivalents thereof.

Having thus described the preferred embodiments, the invention is now claimed to be:

1. A golf ball comprising a core and a cover, wherein said cover comprises a blend of two or more ionomer resins, each ionomer resin comprising from about 18.5% to about 21.5% by weight of a carboxylic acid.

2. The golf ball of claim 1, wherein the carboxylic acid groups of one of the ionomer resins are partially neutralized by sodium ions.

3. The golf ball of claim 1, wherein the carboxylic acid group of one of the ionomer resins are partially neutralized by zinc ions.

4. A golf ball comprising a core and a cover, wherein said cover comprises a blend of two or more ionomer resins, each ionomer resin comprising from about 17% to about 25% by weight of a carboxylic acid.

5. The golf ball of claim 4, wherein the carboxylic acid groups of one of the ionomer resins are partially neutralized by sodium ions.

6. The golf ball of claim 4, wherein the carboxylic acid group of one of the ionomer resins are partially neutralized by zinc ions.

7. The golf ball of claim 4, wherein the carboxylic acid group of one of the ionomer resins are partially neutralized by magnesium ions.

8. A golf ball comprising a core and a cover, wherein said cover comprises a blend of two or more ionomer resins, each ionomer resin comprising of greater than 16% by weight of a carboxylic acid.

9. The golf ball of claim 8, wherein the carboxylic acid groups of one of the ionomer resins are partially neutralized by sodium ions.

10. The golf ball of claim 8, wherein the carboxylic acid group of one of the ionomer resins are partially neutralized by zinc ions.

11. A golf ball comprising a core and a cover, wherein said cover comprises a blend of an ethylene-methacrylic acid copolymer containing greater than 16% by weight methacrylic acid having from about 10% to about 75% of the carboxylic acid groups neutralized with sodium ions, and an ethylene-methacrylic acid copolymer containing greater than 16% by weight methacrylic acid with from about 10% to about 75% of the carboxylic acid groups neutralized by zinc or magnesium ions.

12. A golf ball comprising a core and a cover, wherein said cover comprises a blend of an ethylene-methacrylic acid copolymer containing from about 17% to about 25% by weight methacrylic acid having from about 10% to about 75% of the carboxylic acid groups neutralized with sodium ions, and an ethylene-methacrylic acid copolymer containing from about 17% to about 25% by weight methacrylic acid with from about 10% to about 75% of the carboxylic acid groups neutralized by zinc or magnesium ions.

13. The golf ball of claim 12, wherein the cover further comprises one or more additional ingredients selected from the group consisting of pigments, dyes, U.V. absorbers and optical brighteners.

14. A golf ball comprising a core and a cover, wherein said cover comprises a blend of an ethylene-methacrylic acid copolymer containing from about 18.5% to about 21.5% by weight methacrylic acid having from about 10% to about 75% of the carboxylic acid groups neutralized with sodium ions, and an ethylene-methacrylic acid copolymer containing from about 18.5% to about 21.5% by weight methacrylic acid with from about 10% to about 75% of the carboxylic acid groups neutralized by zinc or magnesium ions.

15. The golf ball of claim 14, wherein the cover further comprises one or more additional ingredients selected from the group consisting of pigments, dyes, U.V. absorbers and optical brighteners.

16. A golf ball comprising a core and a cover, wherein said cover comprises a blend of from about 75 weight percent to about 25 weight percent of an ethylene-methacrylic acid copolymer containing greater than 16% by weight methacrylic acid having from about 10% to about 75% of the carboxylic acid groups neutralized with sodium ions, and from about 25 weight percent to about 75 weight percent of an ethylene-methacrylic acid copolymer containing greater than 16% by weight methacrylic acid with from about 10% to about 75% of the carboxylic acid groups neutralized by zinc or magnesium ions.

17. A golf ball comprising a core and a cover, wherein said cover comprises a blend of from about 90 weight percent to about 10 weight percent of an ethylene-methacrylic acid copolymer containing greater than 16% by weight methacrylic acid having from about 10% to about 75% of the carboxylic acid groups neutralized with sodium ions, and from about 10 weight percent to about 90 weight percent of an ethylene-methacrylic acid copolymer containing greater than 16% by weight methacrylic acid with from about 10% to about 75% of the carboxylic acid groups neutralized by zinc or magnesium ions.

18. A golf ball comprising a core and a cover, wherein said cover comprises a blend of from about 90 weight percent to about 10 weight percent of an ethylene-methacrylic acid copolymer containing from about 18.5 to about 21.5% by weight methacrylic acid having from about 30% to about 70% of the carboxylic acid groups neutralized with sodium ions, and from about 10 weight percent to about 90 weight percent of an ethylene-methacrylic acid copolymer containing from about 18.5% to about 21.5% by weight methacrylic acid with from about 30% to about 70% of the carboxylic acid groups neutralized by zinc or magnesium ions.

19. A golf ball comprising a core and a cover, wherein said cover comprises a blend of from about 75 weight percent to about 25 weight percent of an ethylene-methacrylic acid copolymer containing from about 18.5% to about 21.5% by weight methacrylic acid having from about 30% to about 70% of the carboxylic acid groups neutralized with sodium ions, and from about 25 weight percent to about 75 weight percent of an ethylene-methacrylic acid copolymer containing from about 18.5% to about 21.5% by weight methacrylic acid with from about 30% to about 70% of the carboxylic acid groups neutralized by zinc or magnesium ions.

20. A golf ball comprising a core and a cover, wherein said cover comprises a blend of from about 90 weight percent to about 10 weight percent of an ethylene-methacrylic acid copolymer containing from about 17% to about 25% by weight methacrylic acid having from about 10% to about 75% of the carboxylic acid groups neutralized with sodium ions, and from about 10 weight percent to about 90 weight percent of an ethylene-methacrylic acid copolymer containing from about 17% to about 25% by weight methacrylic acid with from about 10% to about 75% of the carboxylic acid groups neutralized by zinc or magnesium ions.

21. A golf ball comprising a core and a cover, wherein said cover comprises a blend of from about 75 weight percent to about 25 weight percent of an ethylene-methacrylic acid copolymer containing from about 17% to about 25% by weight methacrylic acid having from about 30% to about 70% of the carboxylic acid groups neutralized with sodium ions, and from about 25 weight percent to about 75 weight percent of at least one ethylene-methacrylic acid copolymer containing from about 17% to about 25% by weight methacrylic acid with from about 30% to about 70% of the carboxylic acid groups neutralized by zinc or magnesium ions.

22. A golf ball comprising a core and a cover, wherein said cover comprises a blend of an ethylene-acrylic acid copolymer containing greater than 16% by weight acrylic acid having from about 10% to about 75% of the carboxylic acid groups neutralized with sodium ions, and of an ethylene-acrylic acid copolymer containing greater than 16% by weight acrylic acid with from about 10% to about 75% of the carboxylic acid groups neutralized by zinc ions.

23. A golf ball comprising a core and a cover, wherein said cover comprises a blend of an ethylene-acrylic acid copolymer containing from about 17% to about 25% by weight acrylic acid having from about 10% to about 75% of the carboxylic acid groups neutralized with sodium ions, and of an ethylene-acrylic acid copolymer containing from about 17% to about 25% by weight acrylic acid with from about 10% to about 75% of the carboxylic acid groups neutralized by zinc ions.

24. The golf ball of claim 23, wherein the cover further comprises of one or more additive ingredients selected from the group consisting of pigments, dyes, U.V. absorbers and optical brighteners.

25. A golf ball comprising a core and a cover, wherein said cover comprises a blend of an ethylene-acrylic acid copolymer containing from about 18.5% to about 21.5% by weight acrylic acid having from about 30% to about 70% of the carboxylic acid groups neutralized with sodium ions, and an ethylene-acrylic acid copolymer containing from about 18.5% to about 21.5% by weight acrylic acid with from about 30% to about 70% of the carboxylic acid groups neutralized by zinc ions.

26. The golf ball of claim 25, wherein the cover further comprises of a mixture of one or more pigments, an optical brightener, and/or dye.

27. A golf ball comprising a core and a cover, wherein said cover comprises a blend of from about 90 weight percent to about 10 weight percent of an ethylene-acrylic acid copolymer containing greater than 16% by weight acrylic acid having from about 10% to about 75% of the carboxylic acid groups neutralized with sodium ions, and from about 10 weight percent to about 90 weight percent of an ethylene-acrylic acid copolymer containing greater than 16% by weight methacrylic acid with from about 10% to about 75% of the carboxylic acid groups neutralized by zinc ions.

28. A golf ball comprising a core and a cover, wherein said cover comprises a blend of from about 90 weight percent to about 10 percent of an ethylene-acrylic acid copolymer containing from about 17% to about 25% by weight acrylic acid having from about 30% to about 70% of the carboxylic acid groups neutralized with sodium ions, and from about 10 weight percent to about 90 weight percent of at least one ethylene-acrylic acid copolymer containing from about 17% to about 25% by weight acrylic acid with from about 30% to about 70% of the carboxylic acid groups neutralized by zinc ions.

29. A golf ball comprising a core and a cover, wherein said cover comprises a blend of from about 90 weight percent to about 10% weight percent of an ethylene-acrylic acid copolymer containing from about 18.5% to about 21.5% by weight acrylic acid having from about 30% to about 70% of the carboxylic acid groups neutralized with sodium ions, and from about 10 weight percent to about 90 weight percent of at least one ethylene-acrylic acid copolymer containing from about 18.5% to about 21.5% by weight acrylic acid with from about 30% to about 70% of the carboxylic acid groups neutralized by zinc ions.

30. A golf ball having an improved coefficient of restitution, comprising a core and a cover, wherein said cover comprises a blend of two or more ionomer resins, each ionomer resin comprising greater than 16% by weight of a carboxylic acid.

* * * * *